(No Model.)

L. C. TIFFANY.
ILLUMINATED TILE.

No. 255,210. Patented Mar. 21, 1882.

Witnesses:
E. S. Mailler
James H. Hunter

Inventor:
Louis C. Tiffany

UNITED STATES PATENT OFFICE.

LOUIS C. TIFFANY, OF NEW YORK, N. Y.

ILLUMINATED TILE.

SPECIFICATION forming part of Letters Patent No. 255,210, dated March 21, 1882.

Application filed November 11, 1881. (No model.)

*To all whom it may concern:*

Be it known that I, LOUIS C. TIFFANY, of the city, county, and State of New York, have invented certain new and useful Improvements in Illuminated Tiles; and I do hereby declare the following to be a full, clear, and exact description thereof, reference being had to the accompanying drawings, forming a part of this specification.

My improvements relate to a perforated glass or pottery tile when the openings therein or a number of such openings are filled with a thin layer, either of colored or iridescent or opalescent or metallized glass or metal or pottery, or such openings filled with any number of or all of such substances.

Figure 1:
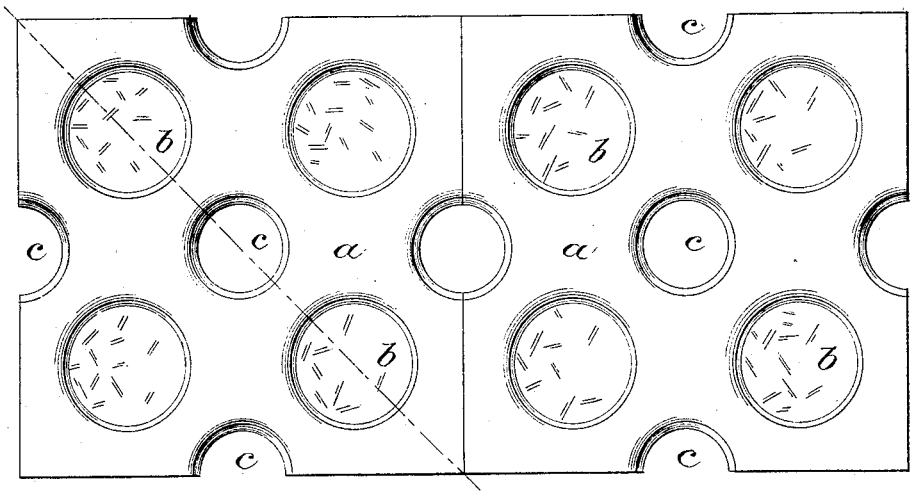
Figure 2:
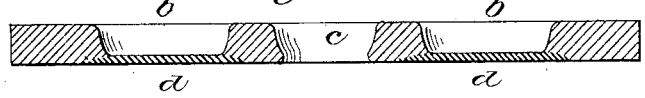
Figure 3:
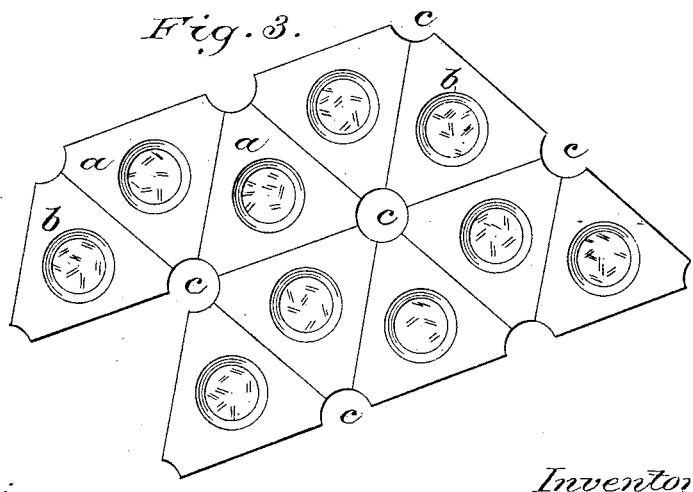

In the drawings, Figure 1 is a plan view of a glass tile constructed according to my improvements. Fig. 2 is a vertical section thereof, taken through the line $x\ x$ of Fig. 1. Fig. 3 is a plan view of a modification of the form of tile shown in Fig. 1.

$a$ is the solid glass portion of the tile. $b\ b$, &c., $c\ c$, &c., are openings or perforations therein, in circular form, as shown in the drawings; or they may be of other convenient form. A number of these openings or perforations $b\ b$, &c., may be closed by a thin layer of colored, iridescent, opalescent, or metallized glass, metal, or pottery. This is accomplished with glass by melting in the glass from one side, so that it takes the form at the rear of the tile as seen at $d\ d$, &c. The other openings, $c\ c$, &c., are uncovered—that is, not in any way ornamented or interfered with. There is thereby produced a perforated glass or pottery tile which, together with the light passing through the body of the tile itself and of the uninterfered with rays of light passing through the open spaces, also the light reflected from the metallized glass and metallic and pottery filled in surfaces, there results a pleasing effect. This effect is much added to when a number of these openings in the tile are closed by a thin layer of transparent material, as stated.

These tiles are intended to be used for ornamental purposes. In case of their use in an interior window or screen or other desired interior structure the advantages of ventilation are obtained by reason of some of the spaces or perforations being left uncovered, as hereinbefore stated.

I claim—

A perforated glass or pottery tile having a portion or the whole of its openings filled with a thin layer of colored, iridescent, opalescent, metallized glass, metal, or pottery, or a combination of any of these substances, substantially as described.

LOUIS C. TIFFANY.

Witnesses:
 JAMES H. HUNTER,
 E. S. MAILLER.